US012585549B2

(12) United States Patent
Kochar et al.

(10) Patent No.: US 12,585,549 B2
(45) Date of Patent: Mar. 24, 2026

(54) BACKING UP DATABASE FILES IN A DISTRIBUTED SYSTEM

(71) Applicant: Rubrik, Inc., Palo Alto, CA (US)

(72) Inventors: Deepti Kochar, San Mateo, CA (US);
Abdullah Reza, Gilroy, CA (US);
Prasenjit Sarkar, Los Gatos, CA (US);
Prabhu Mohan, San Jose, CA (US);
Arjun Sinha, Mountain View, CA (US); Yanzhe Wang, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 184 days.

(21) Appl. No.: 18/094,891

(22) Filed: Jan. 9, 2023

(65) Prior Publication Data

US 2024/0232022 A1     Jul. 11, 2024

(51) Int. Cl.
G06F 11/14 (2006.01)
G06F 11/1446 (2026.01)
G06F 16/182 (2019.01)

(52) U.S. Cl.
CPC ........ G06F 11/1464 (2013.01); G06F 16/182 (2019.01); G06F 2201/84 (2013.01)

(58) Field of Classification Search
None
See application file for complete search history.

(56) References Cited

U.S. PATENT DOCUMENTS

| | | | | |
|---|---|---|---|---|
| 10,042,711 | B1 * | 8/2018 | Chopra | ............... G06F 11/1448 |
| 11,366,830 | B1 * | 6/2022 | Hassan | ................. G06F 16/278 |
| 2021/0042263 | A1 * | 2/2021 | Zdornov | ............. G06F 11/3466 |
| 2021/0124648 | A1 * | 4/2021 | Srinivasan | .......... G06F 11/1451 |

* cited by examiner

*Primary Examiner* — Amresh Singh
(74) *Attorney, Agent, or Firm* — Holland & Hart LLP

(57) ABSTRACT

Methods, systems, and devices for data management are described. A data management system may receive a request to generate backup data for a set of data files from the one or more databases. The data management system may then generate, in response to the request, a file including a set of partitions including respective groups of shard files that correspond to respective groups of data files from among the set of data files. In some examples, a respective group of shard files within a partition of the set of partitions may include a first shard file representative of metadata for the partition and one or more additional shard files representative of the respective group of data files for the partition. The data management system may then distribute the respective groups of shard files to a set of nodes within the distributed backup system.

20 Claims, 11 Drawing Sheets

205

Source
Data
Storage

230

Files
270

275

235

215

Cloud
Platform

220

Target Data
Storage

225

210

280    Metadata

File 1

File 2

...

285    File N

200

Backup Request Component

625

Shard File Distribution Component

635

Modification Component

645

Mapping Component

655

File Generation Component

630

Data File Alignment Component

640

Operation Identification Component

650

620

600

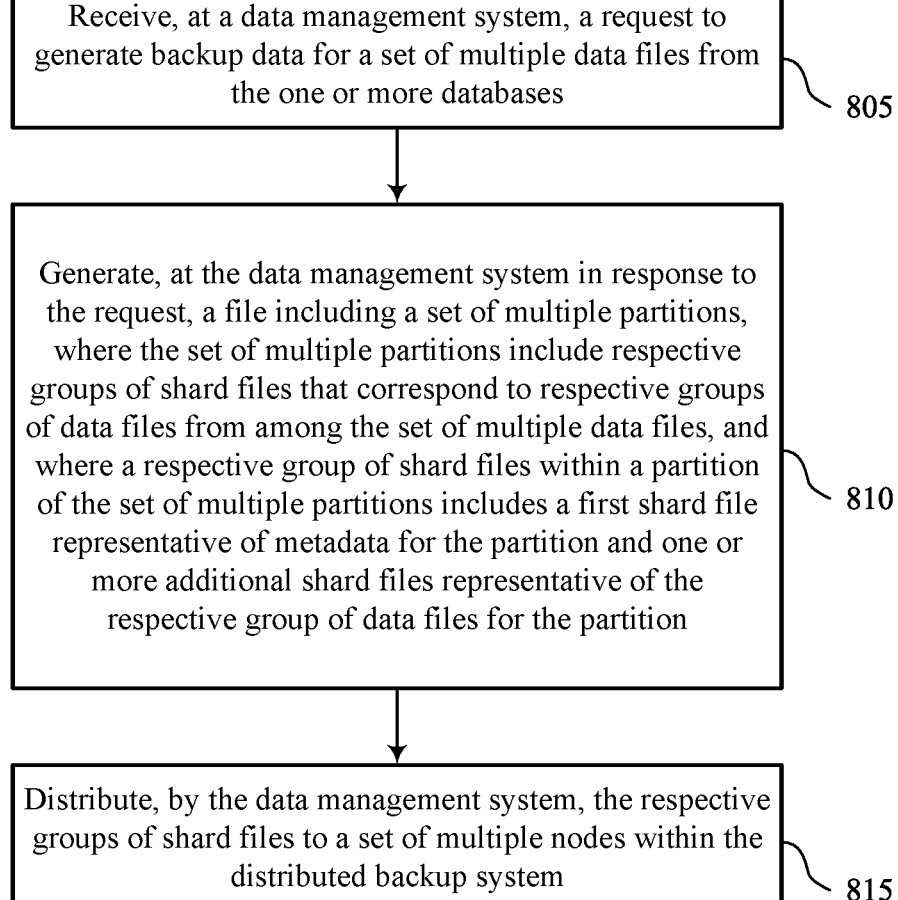

Receive, at a data management system, a request to generate backup data for a set of multiple data files from the one or more databases

805

Generate, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition

810

Distribute, by the data management system, the respective groups of shard files to a set of multiple nodes within the distributed backup system

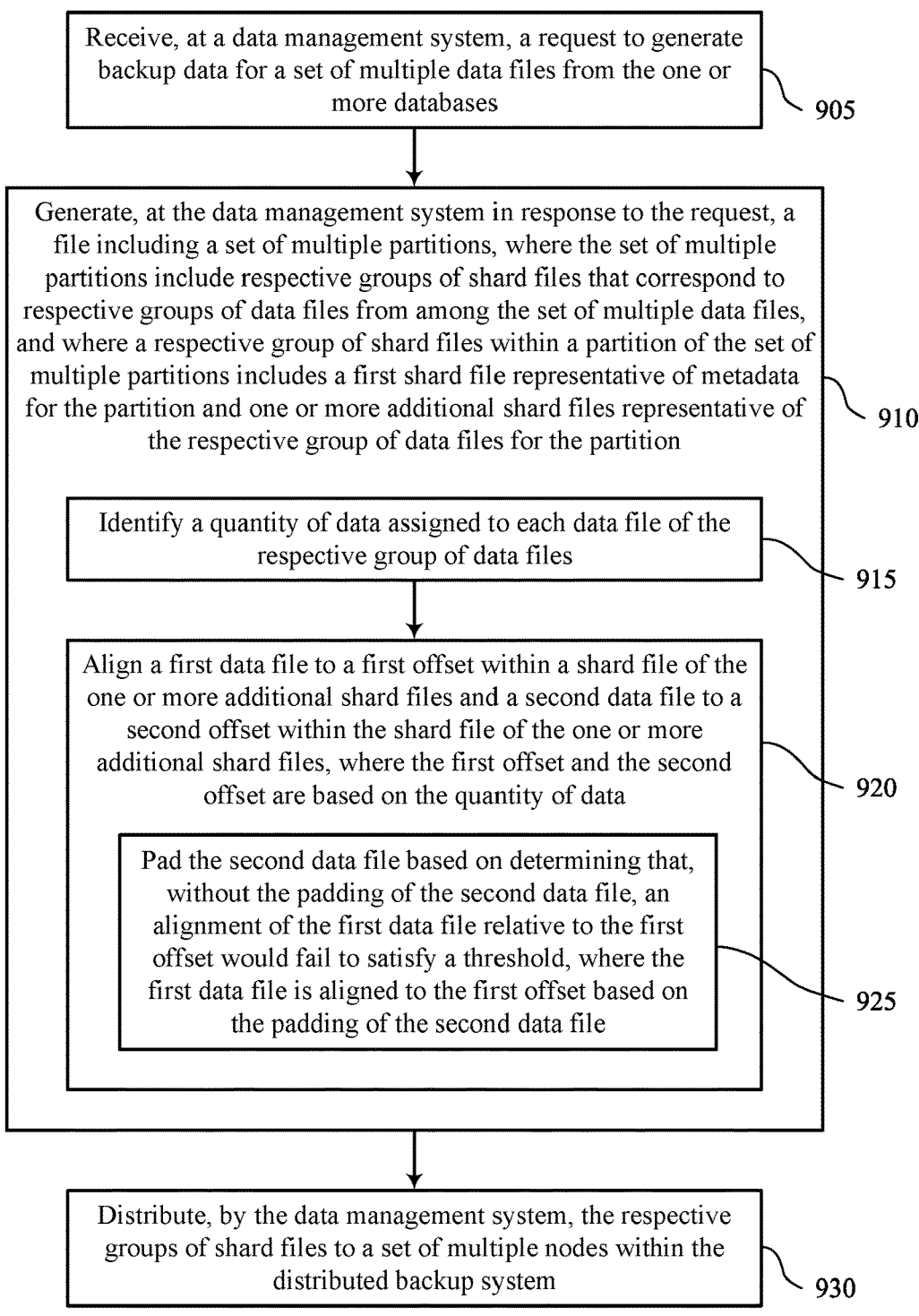

Receive, at a data management system, a request to generate backup data for a set of multiple data files from the one or more databases ⟍ 905

Generate, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition ⟍ 910

Identify a quantity of data assigned to each data file of the respective group of data files ⟍ 915

Align a first data file to a first offset within a shard file of the one or more additional shard files and a second data file to a second offset within the shard file of the one or more additional shard files, where the first offset and the second offset are based on the quantity of data ⟍ 920

Pad the second data file based on determining that, without the padding of the second data file, an alignment of the first data file relative to the first offset would fail to satisfy a threshold, where the first data file is aligned to the first offset based on the padding of the second data file ⟍ 925

Distribute, by the data management system, the respective groups of shard files to a set of multiple nodes within the distributed backup system ⟍ 930

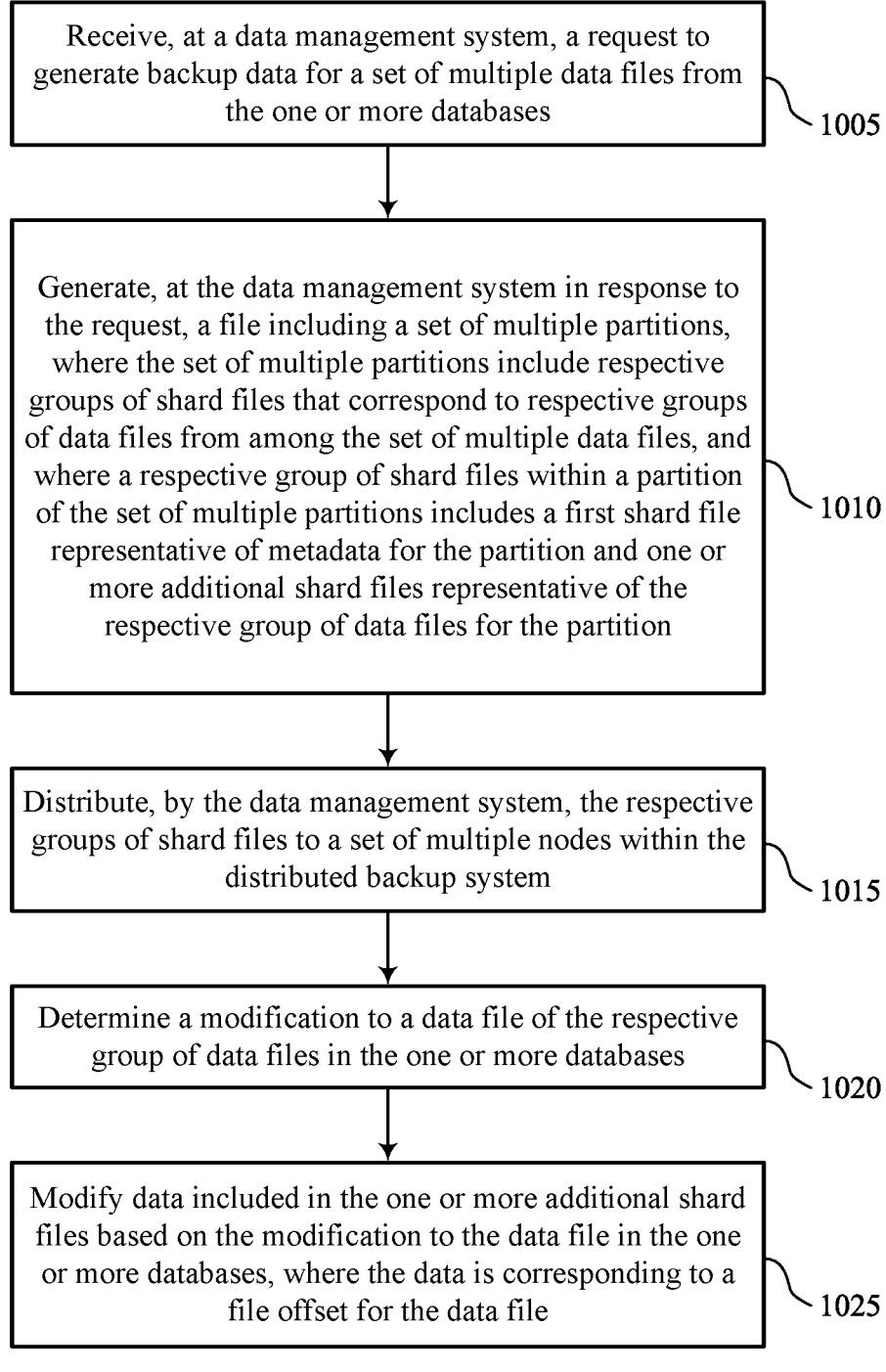

Receive, at a data management system, a request to generate backup data for a set of multiple data files from the one or more databases

1005

Generate, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition

1010

Distribute, by the data management system, the respective groups of shard files to a set of multiple nodes within the distributed backup system

1015

Determine a modification to a data file of the respective group of data files in the one or more databases

1020

Modify data included in the one or more additional shard files based on the modification to the data file in the one or more databases, where the data is corresponding to a file offset for the data file

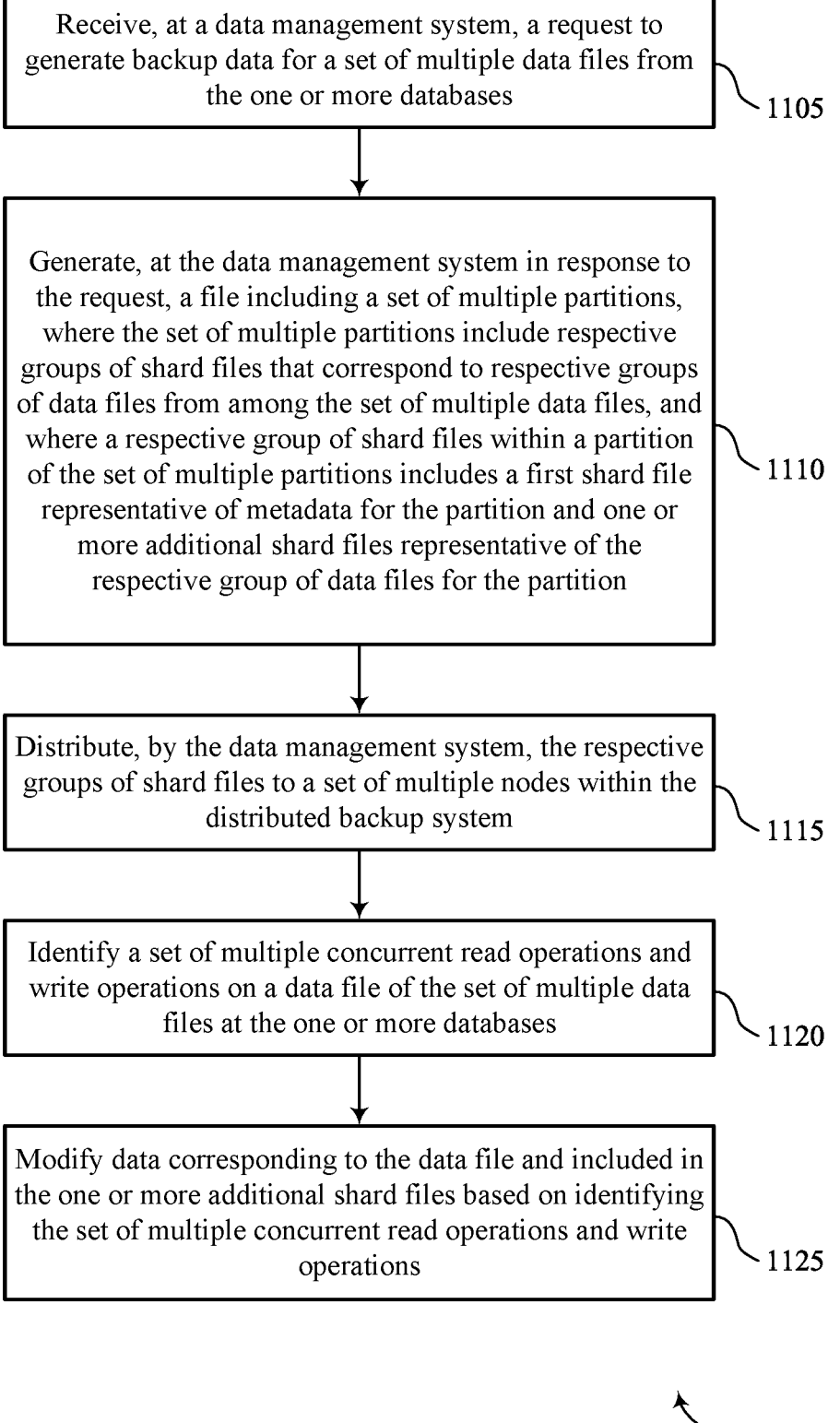

Receive, at a data management system, a request to generate backup data for a set of multiple data files from the one or more databases

1105

Generate, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition

1110

Distribute, by the data management system, the respective groups of shard files to a set of multiple nodes within the distributed backup system

1115

Identify a set of multiple concurrent read operations and write operations on a data file of the set of multiple data files at the one or more databases

1120

Modify data corresponding to the data file and included in the one or more additional shard files based on identifying the set of multiple concurrent read operations and write operations

BACKING UP DATABASE FILES IN A DISTRIBUTED SYSTEM

FIELD OF TECHNOLOGY

The present disclosure relates generally to data management, including techniques for backing up database files in a distributed system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 through 11 illustrate flowcharts showing methods that support backing up database files in a distributed system in accordance with aspects of the present disclosure.

DETAILED DESCRIPTION

A data management system may include a distributed system (e.g., with multiple distributed nodes or clusters of nodes) to support performing data backup for databases. Some databases may include a very large quantity of database files, and one or more problems may arise when backing up such a very large quantity of files using a distributed systems architecture. For example, a large quantity of files being included in a single directory can cause delays and reduce performance because of overhead related to synchronizing a large amount of metadata for a single directory across multiple nodes in a distributed system. Additionally or alternatively, deduplication or other consolidation operations may cause bottlenecks within a distributed system when working with a very large quantity of files in a distributed system, or working with a very large quantity of files in a distributed system may cause the quantity of open files at one time to reach a limit for the distributed system, among other possibilities.

One or more aspects of the present disclosure provide solutions for backing up and restoring databases with a very large file count using a distributed system. A large set of database files may be aggregated into a single file having an aggregated format, where the resulting aggregated format file includes a number of partitions. Each partition may correspond to a group (e.g., a subset) of the database files, such that the quantity of partitions is less than the quantity of database files. Each partition may be considered a single "virtual file" for the corresponding group of database files, so as to reduce the overall file count as applicable for certain backup processes. Further, each partition may be formatted so as to maintain compatibility across various source file formats and support for various deduplication and consolidation operations. In some examples, each partition may include some quantity of shards, where a first shard (or a set of shard files) includes metadata about the group of files corresponding to the partition, and where each of the other shards includes data for one or more files of the group of files corresponding to the partition.

Figure 1:
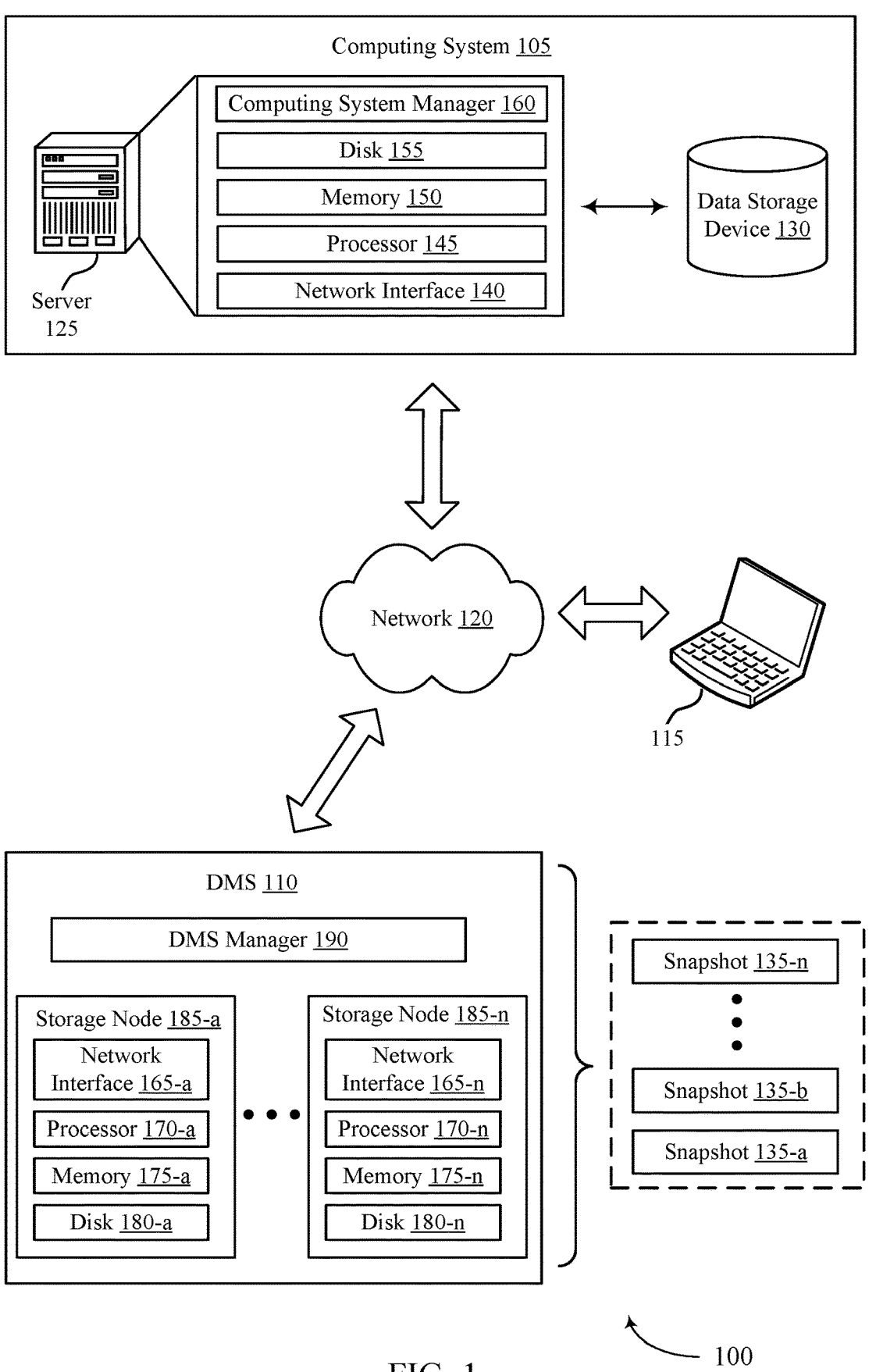
FIG. 1 illustrates an example of a computing environment that supports backing up database files in a distributed system in accordance with aspects of the present disclosure.

FIG. 1 illustrates an example of a computing environment 100 that supports backing up database files in a distributed system in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150) and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

The DMS 110 may receive a request to generate backup data for a set of data files from the one or more databases. The DMS 110 may then generate, in response to the request, a file including a set of partitions. In some examples, the set of partitions may include respective groups of shard files that correspond to respective groups of data files from among the set of data files. In some examples, a respective group of shard files within a partition of the set of partitions may include a first shard file representative of metadata for the partition and one or more additional shard files representative of the respective group of data files for the partition. The DMS 110 may then distribute the respective groups of shard files to a set of nodes within the distributed backup system.

Figure 2:
FIG. 2 illustrates an example of a computing system that supports backing up database files in a distributed system in accordance with aspects of the present disclosure.

FIG. 2 illustrates an example of a computing system 200 that supports backing up database files in a distributed system in accordance with aspects of the present disclosure. The computing system 200 includes a user device 205, a source data storage environment 230, a data management system 210 and a data manager 215. The data management system 210 may be or include a data storage infrastructure. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The data management system 210 may include a target data storage 225 (e.g., first storage node or a distributed storage node). Although not depicted herein, the data management system 210 may include more than one target data storage 225. Multiple target data storages 225 (e.g., storage nodes of a distributed storage architecture) may be geographically separated from each other. As depicted in the example of FIG. 2, the data management system 210 may include a cloud platform 220. The cloud platform 220 may offer an on-demand storage and computing services to the user device 205. In some cases, the data management system 210 may be an example of a storage system with built-in data management. The data management system 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 may support a large number of production databases running on clustered setups. In some examples, such databases may have instances running across multiple nodes of a cluster (e.g., data management system 210 including a computing cluster). The computing system 200 may leverage the high availability and horizontal scalability of cluster configurations to distribute backup load evenly across the nodes in the data management system 210. Aspects depicted herein provide for using a data backup configuration to perform a backup of data from the source data storage environment 230 to a target data storage environment (e.g., data management system 210 including the target data storage 225). In some examples, the source data storage environment 230 may include a larger number of files. Additionally, the target data storage environment may include a set of storage nodes (e.g., distributed storage nodes) managed by the data manager 215.

In some examples, the source data storage environment may store a large number of data files (e.g., a source data storage environment may include up to 66,000 files per database). In some examples, the data manager 215 may support backing up of a large number of data files (e.g., backing up a 305 TB database). The data manager 215 may send the requested to an archive target, download the database to a cloud cluster and restore to a database. As the number of data files increase, the computing system 200 may support backing up of databases having a large number of files. As one example, a database (e.g., source data storage) may include database files having a maximum per tablespace of 1022, and a maximum per database may be 65,533. The database may support a query of over 300 files per database (e.g., a customer that has 10-20 databases may have greater than 10,000 files per database). When backing up files without any modification, a backup database may support a maximum of 32,767 files per database. Additionally, an email server may support, for example, up to 15,000 log files per database. In the standard transaction logging used by the email server, a data manager each may write each database transaction to a log file and then to the database. When a log file reaches 1 MB in size, the data manager may rename the log file, and create a new log file. Over time, this results in a large set of log files. These log files may be truncated only when a database is backed up (which may happen once a day). However, the number of log files can be large. There may not be a threshold for the maximum number of transaction logs and this may be limited by the file system. The large number of files may cause stress to a distributed systems architecture. For instance, there may be too many files under a single directory in distributed systems, thus increasing delays and reducing performance because of the overhead in synchronizing a large amount of metadata across multiple nodes in a distributed system. Additionally or alternatively, when backing up a large number of files, there may be a multitude of jobs trying to deduplicate the contents of each backup, and each job may be short but scheduling delays can build up. This may also be applicable to reverse or consolidate and other associated jobs that are aiming to optimize deduplication.

In some examples, the overall system may hit limits with the number of open files. With a large number of snapshots (in the tens) and an equally large number of database files (in the tens of thousands), the computing system 200 may support a correspondingly large number of snapshotted database files (in the hundreds of thousands) that may need to be opened. In some examples, the computing system 200 may support a configuration for backing up database files in a distributed system. For instance, the computing system 200 may support generation of an aggregated format file to back up the database files.

According to one or more aspects depicted herein, the computing system 200 may support backup and restore databases with a large file count without hitting distributed system limits. Additionally or alternatively, the computing system 200 may support creation of backup files using both sequential write streams (e.g., SQL Server, Exchange) as well as random write streams (e.g., Oracle). The computing system 200 may be deduplication friendly by supporting in-file deduplication to verify that backing up the exact same data file multiple times does not consume increasing amount of storage. The computing system 200 may be consolidation friendly, where the approach is compatible with consolidation so that expired backups can be merged with the head of the current backup chain. The techniques depicted herein may be sharding-friendly, that may allow for sharding so that different data files to be written to and read from in parallel, and may allow for online read-write access to support scenarios such as incremental merge. The performance goal for the backup techniques depicted herein may match a performance of the database backup (e.g., without the backup configuration depicted herein). The replication and archival performance of the backup techniques depicted in the present disclosure may meet customer service level agreements.

According to the aspects of the present disclosure, the data manager 215 may receive a request to generate backup data for a set of data files 270 from the one or more databases (e.g., source data storage). The data manager 215 in combination with the data management system 210 may generate a file 275. The file 275 may include a set of partitions including respective groups of shard files that correspond to respective groups of data files from among the set of data files 270. In some examples, a respective group of shard files within a partition of the set of partitions may include a first shard file representative of metadata for the partition and one or more additional shard files representative of the respective group of data files for the partition. Although depicted as a single shard file, it is to be understood that the metadata may be included in a set of shard files. The data management in backups (e.g., VPF and Patch Files) amenable to aligned dedupe as well as consolidation and can be scaled by sharding. For a particular backup file, the aggregated format file may be or include a collection of objects called partitions. Each partition may include a number of shards, each of which may be an MJF or a patch file. In some examples, each shard may be an MJF, or a patch file. The number of shards and partitions may be specified in the initialization for a job and may remain consistent throughout the lifecycle of the data backup.

The aggregated format file 275 may include a collection of shards. In one example, a maximum of the collection of shards may be 3,000 without loss of generality. In other words, adjusting the maximum may not affect the overall architecture. In the example of FIG. 2, the computing system 200 may support backing up on N files 270. N files 270 may be aggregated such that all N files are represented in whole inside the aggregated format file 275. The format of the aggregated format file 275 as depicted in the example of FIG. 2 may be flexible enough to be written as E file extents belonging to N files. However, for the purpose of simplicity, this example shows N whole files. In some examples, there may be two types of shards in a partition: the first shard 280 or shard 0 is the metadata shard includes metadata about the partition associated with the shard that the partition belongs to and a second shard file 285. Assuming the N files can be laid out in a single shard and also assuming a block size of B bytes, FIG. 2 depicts the layout of the files within a single shard. In some examples, the value of B may be set to 1048576 (1 Megabyte), though it may be possible to make this configurable. The data manager 215 in combination with the data management system 210 may generate the aggregated format file 275 in accordance with Table 1:

TABLE 1

| Offset | Contents | Comments |
|---|---|---|
| AlignBBytes(Content Start) | File 1 start | Content Start |
| File 1 size | Start of padding to align File 2 start to B bytes | Padding will not be necessary if File 1 size is B bytes aligned |
| AlignBBytes(File 1 size) | File 2 start | |
| File 2 size | Start of padding to align File 3 start to B bytes | Padding will not be necessary if File 2 size is B bytes aligned |
| AlignBBytes(File 2 start + File 2 size) | File 3 start | |
| Pattern Continues | Pattern Continues | Pattern Continues |
| AlignBBytes(File N-1 start + File N-1 size) | File N start | |
| File N size | Start of padding to align next incoming file start to B bytes | Padding will not be necessary if File N size is B bytes aligned | system 210 may then distribute the respective groups of shard files to a set of nodes within the distributed backup system (e.g., target data storage). In some examples, the data manager 215 and the data management system 210 may support backing up files may in a set of nodes, where, by applying the backup configuration depicted herein, a file may be backed up in the same node in consecutive backups and files may be backed up in the same order in consecutive backups. Additionally or alternatively, the computing system 200 may support online access to the format, meaning that files may be read and written in any random order.

The data manager 215 in combination with the data management system 210 may aggregate the files 270) in a format such that multiple files are aggregated into a single file in a way that is compatible with the various formats used In some examples, upon receiving a request to back up the files 270, the data manager 215 and the data management system 210 may identify a quantity of data assigned to each data file of the respective group of data files. Then, the data manager 215 and the data management system 210 may align a first data file to a first offset within a shard file of the one or more additional shard files and a second data file to a second offset within the shard file of the one or more additional shard files. In some examples, the first offset and the second offset may be based on the quantity of data. As depicted in Table 1, once File 1 is aligned and the data manager 215 and the data management system 210 may start padding to align the start of File 2 to B bytes. For instance, the data manager 215 and the data management system 210 may pad the second data file based on determining that, without the padding of the second data file, an alignment of the first data file relative to the first offset would fail to satisfy a threshold. In some cases, the first data file may be aligned to the first offset based on the padding of the second data file. As shown in Table 1, padding for File 2 may not be necessary if File 1 size is B bytes aligned.

In some examples, not all files may not be available when the aggregated format file is created. That is, the computing system 200 may support addition of files to the format in a streaming manner as the metadata is finalized at the end. In a future backup, a file may be modified but there may not be a size change. In this case, the data corresponding to the file offsets within the aggregated format file segment may be directly modified. Additionally or alternatively, a file may be modified and the size may decrease. In this case, the data corresponding to the file offsets within the aggregated format file segment may be directly modified and the file metadata may be updated to reflect the reduced file size. This may create a hole in the aggregated format file segment. However, the hole in the aggregated format file format may support creation of a sparse format in a very large exabyte scale file. In some examples, the computing system 200 may support punching holes for the deleted blocks so that other processes can garbage collect the space. The act of punching holes may zero out the freed up space. The computing system may keep track on the holes to account for the space utilization for every shard. Additionally or alternatively, a file may be modified and the size may increase. In some examples, for all modifications within the original file size, first space may be allocated via truncation and then the data corresponding to the file offsets within the aggregated format file segment may be directly modified. For patch files, an important consideration is that extensions to a file may follow the rules of strict sequential writes required by patch files. In some examples, the file metadata may also be updated to reflect the increased file size. According to one or more aspects of the present disclosure, the data manager 215 and the data management system 210 may determine a modification to a data file of the respective group of data files in the one or more databases (e.g., source data storage environment 230). The data manager 215 and the data management system 210) may modify data included in the one or more additional shard files (e.g., second shard file 285) based on the modification to the data file in the one or more databases. In some examples, the data may be corresponding to a file offset for the data file. Additionally or alternatively, the data manager 215 and the data management system 210 may modify the metadata in shard 280) corresponding to the data to reflect the modification to a data file including a decrease in file size of the data file or an increase in file size of the data file.

A deleted file can be reduced to the case of a file modification where the size is reduced to zero. The deleted blocks may be available for allocation and the previously stated garbage collection rules apply. In some examples, inserted file can be reduced to the case of a file modification where the original file size is 0. The filename is represented by a unique relative name and may be unique inside this file format.

The computing system 200 may support mechanisms of reading and writing an aggregated format file partition. For writing, an application (e.g., via application server 235) may provide as input, a set of N files or E file extents to write and then, may lay out the N files or E file extents according to the format described herein. In some examples, the data manager 215 may write out the N files or E extents, where each file or extent starts at a block size aligned offset. The data manager 215 may also keep track of the start offsets of the N files or E extents (an important consideration for scale if in future use cases N or E become very large).

The data manager 215 may then write out the metadata shard. In case of reading, the data manager 215 may receive an input as a single file and may output a set of files that are written into a target non-second data file storage directory. In some examples, the data manager 215 may read the metadata shard to get a list of files or extents, along with their metadata and offset ranges. This may include re-hydration depending on chain length and other associated criteria in restoring a file from backups. For each file or extent, the data manager 215 may begin at the start offset, read file or extent bounded by size, and save into the target directory. The scope of deduplication may be limited to a file. The computing system 200 may be based on the principle that the start of every file or extent start offset has the property of 64 KB alignment. In some examples, the data manager 215 and the data management system 210 may verify that each file extent starts at the same 64 block offset in a sequence of backups, regardless of whether the sequence is full and incremental. For example, the data manager 215 and the data management system 210 may align one or more extended file portions corresponding to the respective group of data files in a set of backups. In such examples, each extended file portion of the one or more extended file portions may begin at a common offset in the set of backups. This may support addition of new files, deletion of older files, and growth and shrinkage of files. According to the aspect depicted herein, the computing system 200 may ensure that start offsets or extent offsets of files are always fixed in the aggregated file. Any extensions and new files may always be appended to the section before a directory block and any deletions and file size may be left as holes in the patch file.

In general, backups may be considered offline writes—this may be because backup data can be staged in an intermediate area and merged onto the main format in an offline process without there being any process concurrently reading the data. However, there may be situations where this constraint is violated. For example, reads and writes may happen concurrently. Similarly, during an incremental merge, the image of the prior snapshot may be read while at the same time the above-mentioned image is being written to. To facilitate reads and writes, the data manager may export backups to an application, which then does concurrent reads and writes. For example, the data manager 215 may identify a set of concurrent read operations and write operations on a data file of the set of data files 270 at the one or more databases. The data manager 215 may then modify data corresponding to the data file and included in the one or more additional shard files (e.g., second shard file 285) based on identifying the set of concurrent read operations and write operations. In some examples, modifying including performing a set of write operations on the data file or performing a set of read operations on the data file or both.

To begin creating a live mount of a database, the user may provide a recovery point obtainable by previous snapshot and transaction log backups, and a target host on which the live mount is created. The data manager 215 may materialize all of the necessary data files directly onto secondary data file storage and may expose these files collectively as a share. And finally, the data manager 215 may pass information about this share to a connector installed on the target host (e.g., target data storage 225). The connector may bring the new database online by pointing the database instance to the data files hosted on the computing system 200. If necessary, transaction logs may be replayed and applied to provide the desired recovery point. The challenge may be that the materialized file is an aggregation of a lot of files and by itself may be opaque to the application. So, there may be a translation layer between the export and the aggregated file.

While the translation layer can be built, there may be challenges involving familiarity and other technical challenges. According to one or more aspects depicted herein, the computing system 200 provides for creation of an aggregated format file layer that sits on top of standard files and exposes individual files to applications. The challenge of this layer is to deal with low tens of thousands of files. Aggregated format files (e.g., aggregated format file 275) may support mapping files in the aggregated format file as individual files that can be exported to applications. Additionally or alternatively, the aggregated format file may support writes to the files that are stored in a backing shard file corresponding to each aggregated format file. In some examples, the aggregated format file may support reads to the files merged from a journal file corresponding to a file and a backing file. For example, the data manager 215 and the data management system 210 may map the set of data files 270 in the file 275 including the set of partitions to individual files capable of being exported to application.

The aggregated format file may be highly parallel. The aggregated format file deployment for a snapshot may be divided into a large number of partitions, where each partition hosts files that belong to the namespace. In some cases, files may belong to a single partition and each snapshot may divide the files among the partitions. Each partition may be tied to a single storage node because the backing files for the aggregated format file in a partition may be owned by a single storage node. For example, each partition of the set of partitions in the aggregated format file 275 may be associated with a same node at the data management system. In some cases, all writes to a partition may be applied to the same storage node. Many of the aggregated format file interface calls may have affinity to a single node. For instance, all I/O may proceed in parallel to every node and, all I/O may proceed in parallel to every partition. Within a partition, the parallelism to the files may be limited by metadata updates such as creates, truncates and deletes which may hold exclusive locks on the metadata. If there are no metadata updates, then I/O within a partition can also proceed in parallel.

In some examples, the computer system 200 may support maintaining the node to partition mapping (not having the knowledge may result in calls to a node which does own the partition in question may fail). The techniques for backup may apply to any multi-node multi-channel database.

Figure 3:
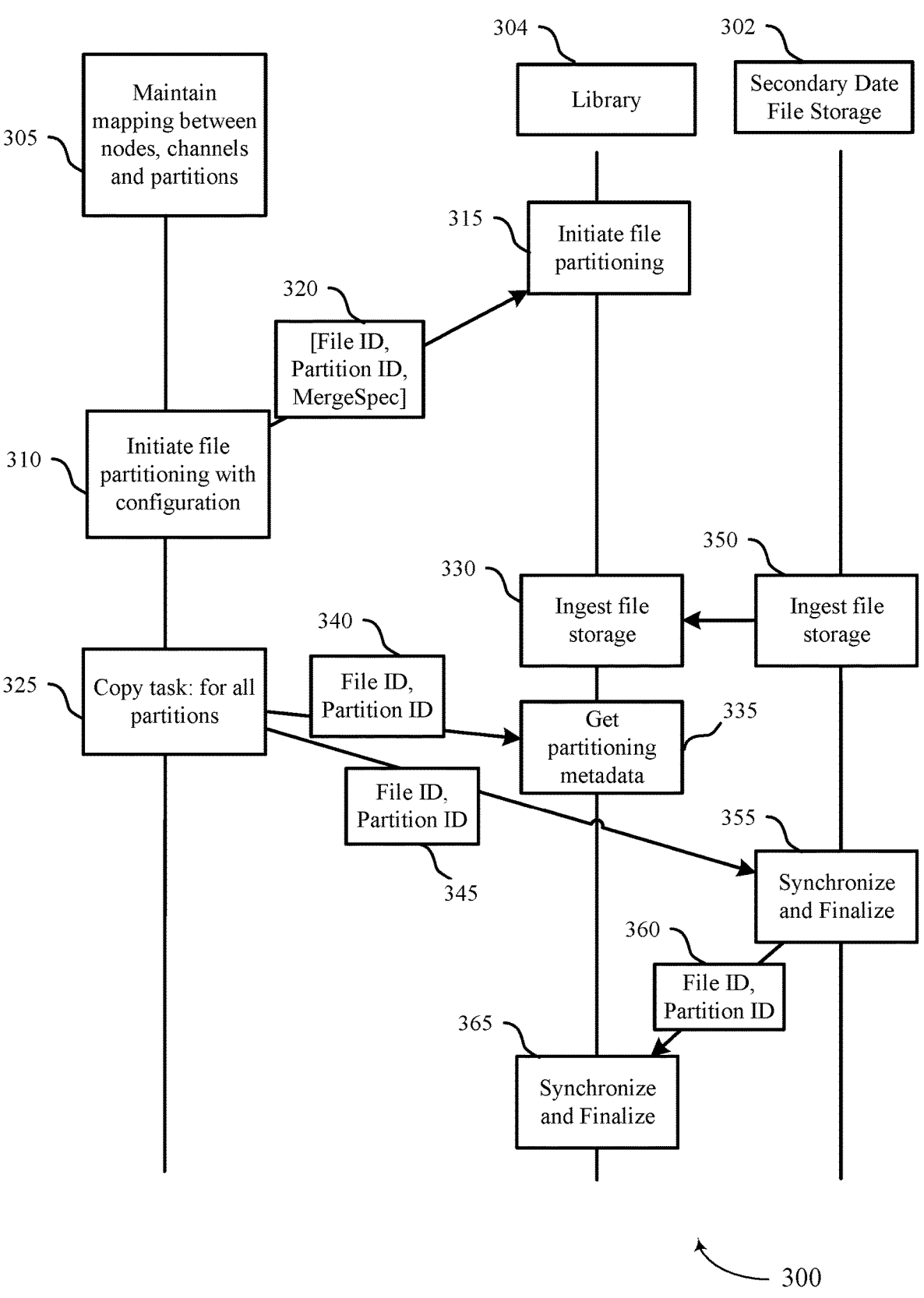
FIG. 3 illustrates an example of a process flow that supports backing up database files in a distributed system in accordance with aspects of the present disclosure.

FIG. 3 illustrates an example of a process flow 300 that supports backing up database files in a distributed system in accordance with aspects of the present disclosure. The process flow 300 may be implemented by a computing system, as depicted with the example of FIG. 2.

The techniques depicted herein provide for generation of a single aggregated format file for backing up a large number of files to multiple nodes in a distributed storage. Such backups may happen from multiple nodes, have overwrites, and can switch between nodes on failure and the order of files is not being maintained between backups. When performing a full backup, a source database may ingest a lot of database image files and store them in a secondary data file storage 302.

At 305, the data storage may maintain mapping between nodes, channels, and partitions. To integrate with an aggregate format file, the data storage may initiate file partitioning with a configuration. The data storage may also initiate a number of partitions and part of the configuration. In some examples, the number of partitions may be fixed. At 315, the data storage may initiate a file partitioning (by calling InitPartition with the requisite number of partitions and shards to the library 315). The data storage may request the initiation of file partitioning by transmitting a file identifier, a partition identifier, and a merge spec, at 320. The merge spec may be for all the shards in each partition.

At 325, the data storage may copy tasks for all partitions. In some examples, the data storage may wait for all files across all partitions to get ingested and may then issue a proper functioning condition for a partition. The data storage may export all partitions via channels to a database host. The data storage may instruct the distributed storage to back up the files to the various mount points. For instance, at 330, the data storage may ingest file storage at the library 304 and at 350, the secondary data file storage 302 may ingest the file storage. At 335, the library 304 may get partitioning metadata including file identifier and partitioning identifier 340.

The files may be backed up in aggregated format file partitions where they are stored in the data shards for every partition. Once the ingestion process is complete, at 355, the aggregated format file may issue a synchronize and finalize command (e.g., SyncAndFinalize via file identifier and partition identifier 345) and call for all partitions and then starts the process of proper functioning condition for each shard in a partition (via indicating file identifier and partition identifier 360). At 365, the library 304 may also initiate a synchronize and finalize process. Finally, the data storage exposes the snapshot with the patch files corresponding to shards of all partitions for the full backup job.

Figure 4:
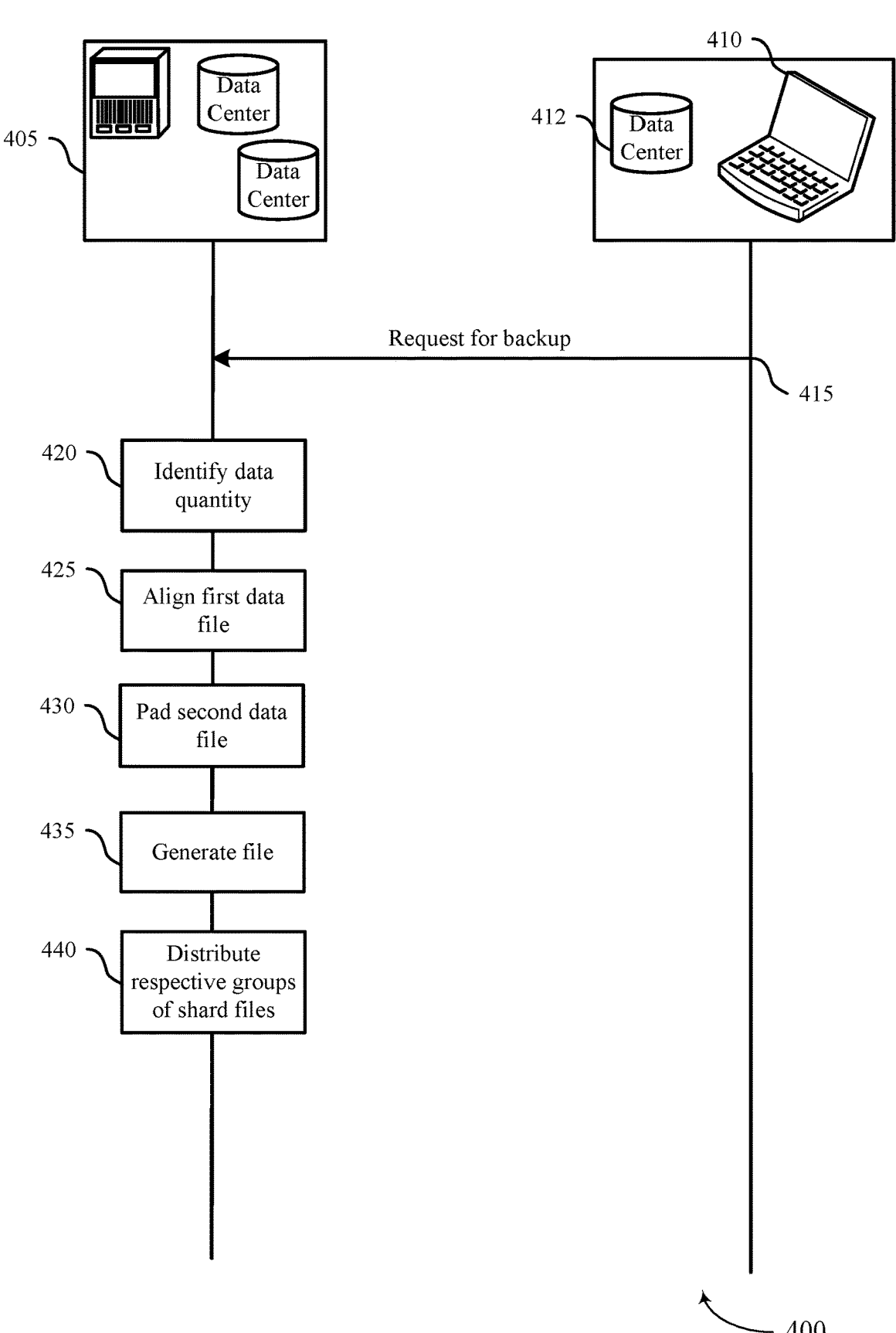
FIG. 4 illustrates an example of a process flow that supports backing up database files in a distributed system in accordance with aspects of the present disclosure.

FIG. 4 illustrates an example of a process flow 400 that supports backing up database files in a distributed system in accordance with aspects of the present disclosure. The process flow 400 includes a data management system 405 including a target data storage environment and a user device 410 including a source data storage environment 412. The data management system 405 may include an application server, a metadata storage and multiple data centers of a computing cluster as described with respect to FIGS. 2 and 3. The source data storage environment 412 may include a first set of data files managed by a user of a data management system 405. The data management system 405 may include a target data storage environment including a second set of data files managed by the data management system 405, where the second set of data files include a backup of the first set of data files. The user device 410 may be an example of a user device as described with respect to FIGS. 2 and 3. Although a single entity is depicted as data management system 405, it may be understood that components of the data management system 405 may be located in different locations.

In some examples, the operations illustrated in the process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 415, the data management system 405 may receive a request to generate backup data for a set of data files from the one or more databases (e.g., data center).

At 420, the data management system 405 may identify a quantity of data assigned to each data file of a respective group of data files. At 425, the data management system 405 may align a first data file to a first offset within a shard file of one or more additional shard files and a second data file to a second offset within the shard file of the one or more additional shard files. In some examples, the first offset and the second offset may be based on the quantity of data.

At 430, the data management system 405 may pad the second data file based on determining that, without the padding of the second data file, an alignment of the first data file relative to the first offset would fail to satisfy a threshold. In some examples, the first data file may be aligned to the first offset based on the padding of the second data file.

At 435, the data management system 405 may generate, in response to the request received at 415, a file including a set of partitions. In some examples, the set of partitions may include respective groups of shard files that correspond to respective groups of data files from among the set of data files. Additionally or alternatively, a respective group of shard files within a partition of the set of partitions may include a first shard file representative of metadata for the partition and one or more additional shard files representative of the respective group of data files for the partition. In some cases, the file includes an aggregated format file. In some examples, the data management system 405 may map the set of data files in the file including the set of partitions to individual files capable of being exported to application. Additionally or alternatively, each partition of the set of partitions is associated with a same node at the data management system 405.

At 440, the data management system 405 may distribute the respective groups of shard files to a set of nodes within the distributed backup system.

Figure 5:
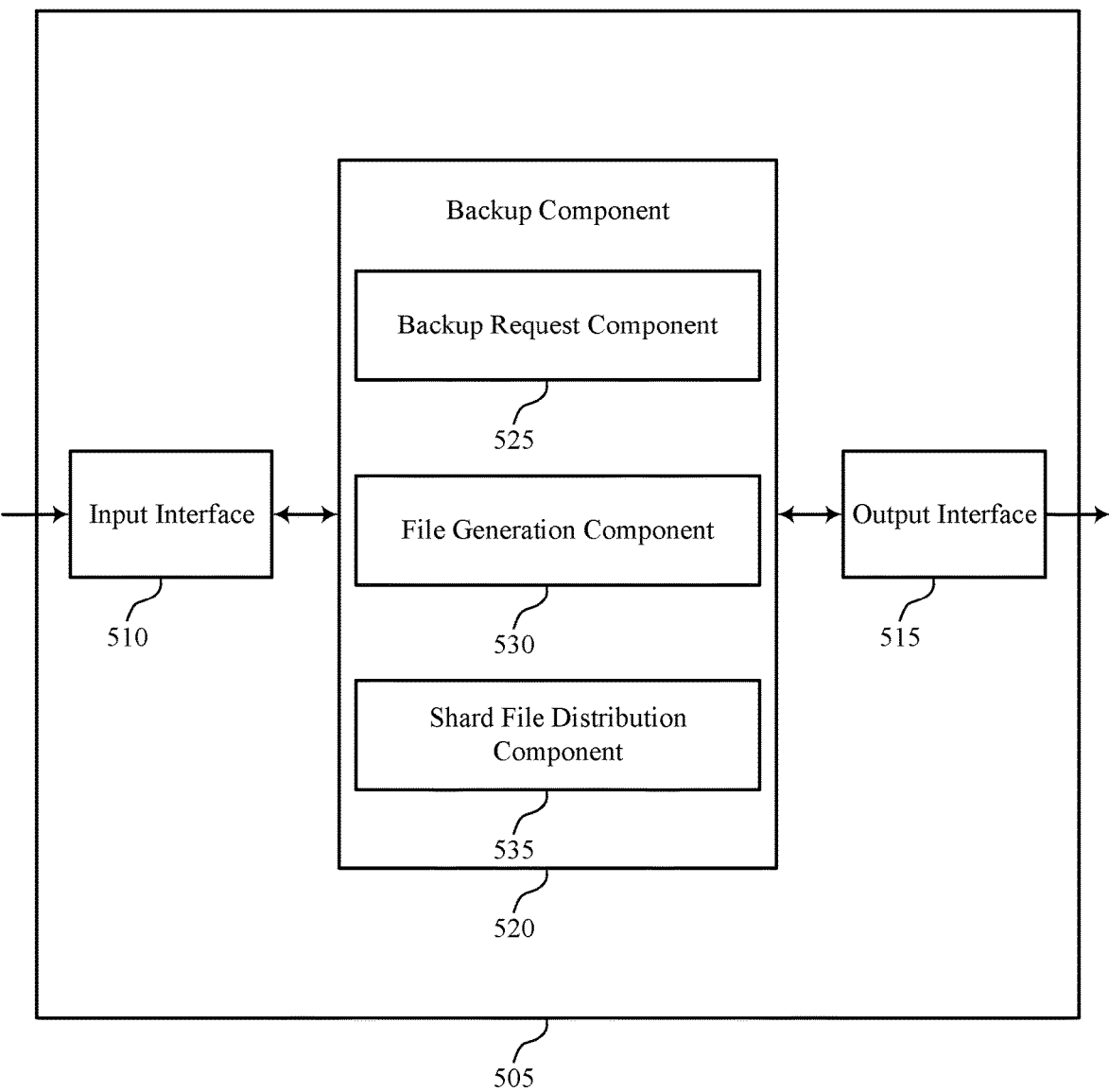
FIG. 5 illustrates a block diagram of an apparatus that supports backing up database files in a distributed system in accordance with aspects of the present disclosure.

FIG. 5 illustrates a block diagram 500 of a system 505 that supports backing up database files in a distributed system in accordance with aspects of the present disclosure. In some examples, the system 505 may be an example of aspects of one or more components described with reference to FIG. 1, such as a DMS 110. The system 505 may include an input interface 510, an output interface 515, and a backup component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the backup component 520 to support backing up database files in a distributed system. In some cases, the input interface 510 may be a component of a network interface 725 as described with reference to FIG. 7.

The output interface 515 may manage output signaling for the system 505. For example, the output interface 515 may receive signaling from other components of the system 505, such as the backup component 520, and may transmit such output signaling corresponding to (e.g., representative of or otherwise based on) such signaling to other systems or devices. In some cases, the output interface 515 may be a component of a network interface 725 as described with reference to FIG. 7.

For example, the backup component 520 may include a backup request component 525, a file generation component 530, a shard file distribution component 535, or any combination thereof. In some examples, the backup component 520, or various components thereof, may be configured to perform various operations (e.g., receiving, monitoring, transmitting) using or otherwise in cooperation with the input interface 510, the output interface 515, or both. For example, the backup component 520 may receive information from the input interface 510, send information to the output interface 515, or be integrated in combination with the input interface 510, the output interface 515, or both to receive information, transmit information, or perform various other operations as described herein.

The backup component 520 may support backing up one or more databases using a distributed backup system in accordance with examples as disclosed herein. The backup request component 525 may be configured as or otherwise support a means for receiving, at a data management system, a request to generate backup data for a set of multiple data files from the one or more databases. The file generation component 530 may be configured as or otherwise support a means for generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition. The shard file distribution component 535 may be configured as or otherwise support a means for distributing, by the data management system, the respective groups of shard files to a set of multiple nodes within the distributed backup system.

Figure 6:
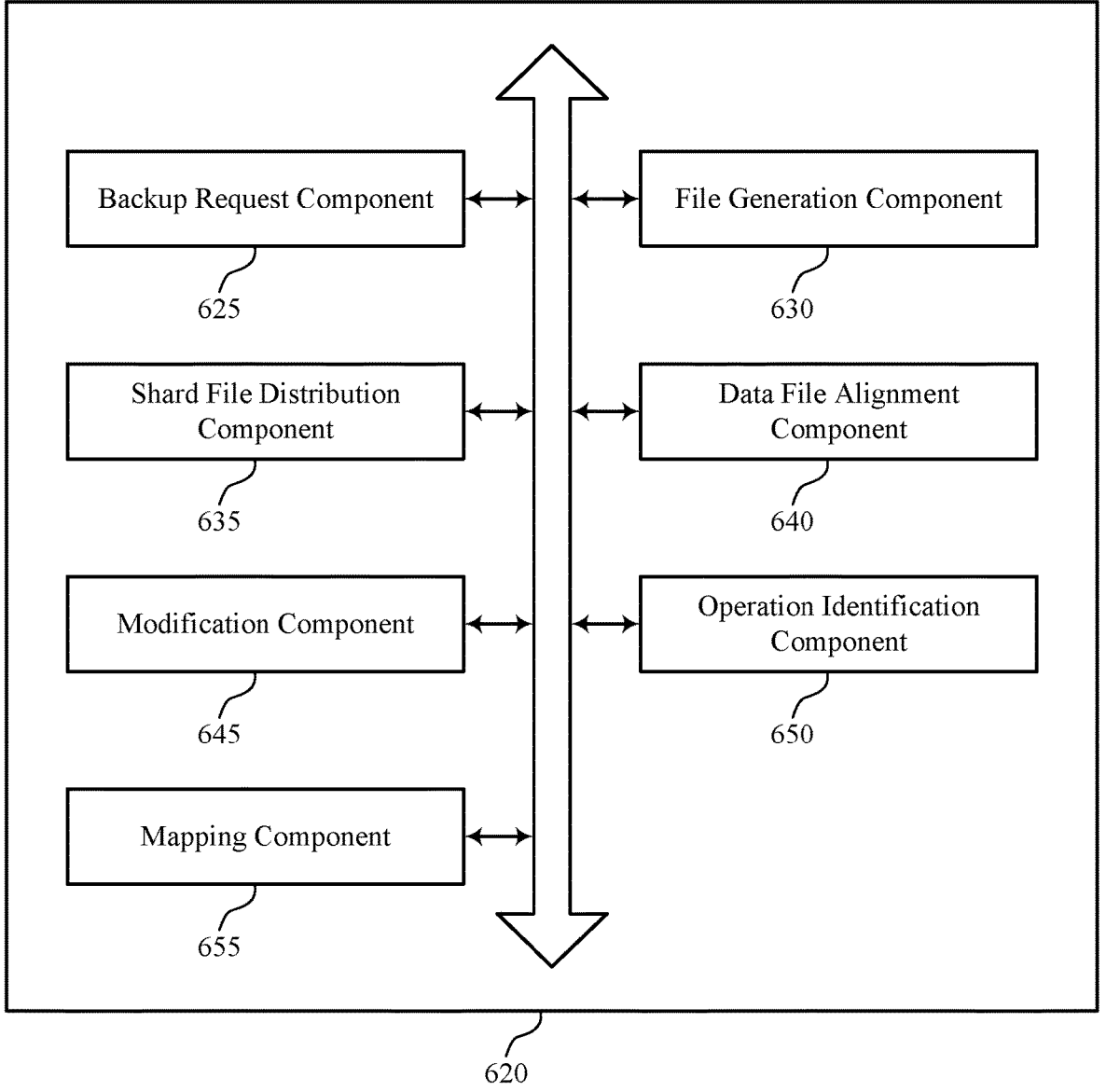
FIG. 6 illustrates a block diagram of a backup component that supports backing up database files in a distributed system in accordance with aspects of the present disclosure.

FIG. 6 illustrates a block diagram 600 of a backup component 620 that supports backing up database files in a distributed system in accordance with aspects of the present disclosure. The backup component 620 may be an example of aspects of a backup component or a backup component 520, or both, as described herein. The backup component 620, or various components thereof, may be an example of means for performing various aspects of backing up database files in a distributed system as described herein. For example, the backup component 620 may include a backup request component 625, a file generation component 630, a shard file distribution component 635, a data file alignment component 640, a modification component 645, an operation identification component 650, a mapping component 655, or any combination thereof. Each of these components may communicate, directly or indirectly, with one another (e.g., via one or more buses, communications links, communications interfaces, or any combination thereof).

The backup component 620 may support backing up one or more databases using a distributed backup system in accordance with examples as disclosed herein. The backup request component 625 may be configured as or otherwise support a means for receiving, at a data management system, a request to generate backup data for a set of multiple data files from the one or more databases. The file generation component 630 may be configured as or otherwise support a means for generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition. The shard file distribution component 635 may be configured as or otherwise support a means for distributing, by the data management system, the respective groups of shard files to a set of multiple nodes within the distributed backup system.

In some examples, to support generating the file, the file generation component 630 may be configured as or otherwise support a means for identifying a quantity of data assigned to each data file of the respective group of data files. In some examples, to support generating the file, the data file alignment component 640 may be configured as or otherwise support a means for aligning a first data file to a first offset within a shard file of the one or more additional shard files and a second data file to a second offset within the shard file of the one or more additional shard files, where the first offset and the second offset are based on the quantity of data.

In some examples, the data file alignment component 640 may be configured as or otherwise support a means for padding the second data file based on determining that, without the padding of the second data file, an alignment of the first data file relative to the first offset would fail to satisfy a threshold, where the first data file is aligned to the first offset based on the padding of the second data file.

In some examples, the modification component 645 may be configured as or otherwise support a means for determining a modification to a data file of the respective group of data files in the one or more databases. In some examples, the modification component 645 may be configured as or otherwise support a means for modifying data included in the one or more additional shard files based on the modification to the data file in the one or more databases, where the data is corresponding to a file offset for the data file.

In some examples, the modification component 645 may be configured as or otherwise support a means for modifying the metadata corresponding to the data to reflect the modification to a data file including a decrease in file size of the data file or an increase in file size of the data file.

In some examples, to support generating the file, the data file alignment component 640 may be configured as or otherwise support a means for aligning one or more extended file portions corresponding to the respective group of data files in a set of backups, where each extended file portion of the one or more extended file portions begins at a common offset in the set of backups.

In some examples, the operation identification component 650 may be configured as or otherwise support a means for identifying a set of multiple concurrent read operations and write operations on a data file of the set of multiple data files at the one or more databases. In some examples, the modification component 645 may be configured as or otherwise support a means for modifying data corresponding to the data file and included in the one or more additional shard files based on identifying the set of multiple concurrent read operations and write operations.

In some examples, the modifying includes performing a set of multiple write operations on the data file or performing a set of multiple read operations on the data file or both.

In some examples, to support generating the file, the mapping component 655 may be configured as or otherwise support a means for mapping the set of multiple data files in the file including the set of multiple partitions to individual files capable of being exported to application.

In some examples, each partition of the set of multiple partitions is associated with a same node at the data management system.

In some examples, the file includes an aggregated format file.

Figure 7:
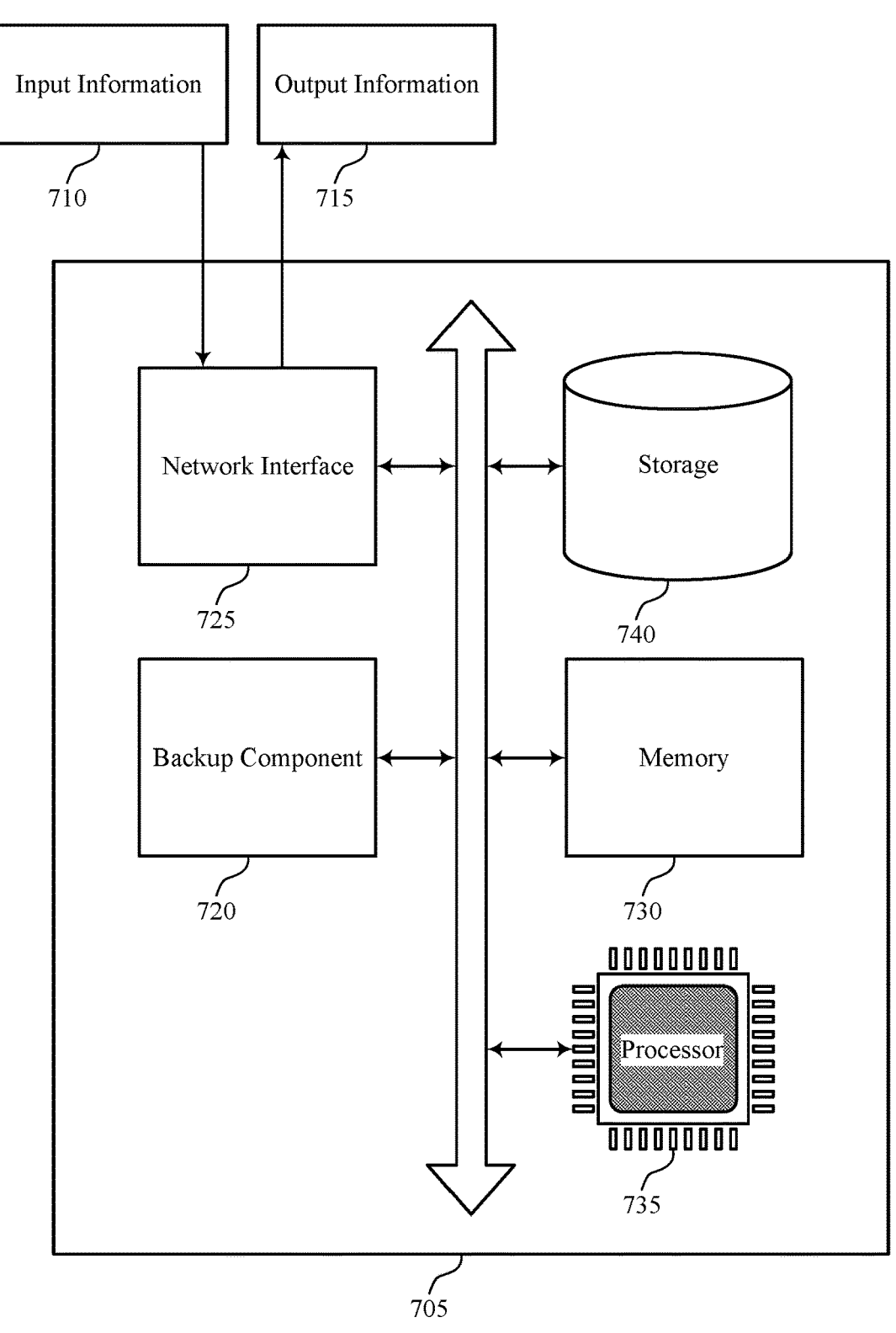
FIG. 7 illustrates a diagram of a system including a device that supports backing up database files in a distributed system in accordance with aspects of the present disclosure.

FIG. 7 illustrates a block diagram 700 of a system 705 that supports backing up database files in a distributed system in accordance with aspects of the present disclosure. The system 705 may be an example of or include the components of a system 505 as described herein. The system 705 may include components for data management, including components such as a backup component 720, an input information 710, an output information 715, a network interface 725, a memory 730, a processor 735, and a storage 740. These components may be in electronic communication or otherwise coupled with each other (e.g., operatively, communicatively, functionally, electronically, electrically: via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730) may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting backing up database files in a distributed system). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

The backup component 720 may support backing up one or more databases using a distributed backup system in accordance with examples as disclosed herein. For example, the backup component 720 may be configured as or otherwise support a means for receiving, at a data management system, a request to generate backup data for a set of multiple data files from the one or more databases. The backup component 720 may be configured as or otherwise support a means for generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition. The backup component 720 may be configured as or otherwise support a means for distributing, by the data management system, the respective groups of shard files to a set of multiple nodes within the distributed backup system.

By including or configuring the backup component 720 in accordance with examples as described herein, the system 705 may support techniques for backing up database files in a distributed system, which may provide one or more benefits such as, for example, improved reliability, reduced latency, and improved user experience, among other possibilities.

FIG. 8 illustrates a flowchart showing a method 800 that supports backing up database files in a distributed system in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include receiving, at a data management system, a request to generate backup data for a set of multiple data files from the one or more databases. The operations of 805 may be performed in accordance with examples as disclosed herein. In some examples, aspects of the operations of 805 may be performed by a backup request component 625 as described with reference to FIG. 6.

At 810, the method may include generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition. The operations of 810 may be performed in accordance with examples as disclosed herein. In some examples, aspects of the operations of 810 may be performed by a file generation component 630 as described with reference to FIG. 6.

At 815, the method may include distributing, by the data management system, the respective groups of shard files to a set of multiple nodes within the distributed backup system. The operations of 815 may be performed in accordance with examples as disclosed herein. In some examples, aspects of the operations of 815 may be performed by a shard file distribution component 635 as described with reference to FIG. 6.

FIG. 9 illustrates a flowchart showing a method 900 that supports backing up database files in a distributed system in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include receiving, at a data management system, a request to generate backup data for a set of multiple data files from the one or more databases. The operations of 905 may be performed in accordance with examples as disclosed herein. In some examples, aspects of the operations of 905 may be performed by a backup request component 625 as described with reference to FIG. 6.

At 910, the method may include generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition. The operations of 910 may be performed in accordance with examples as disclosed herein. In some examples, aspects of the operations of 910 may be performed by a file generation component 630 as described with reference to FIG. 6.

At 915 (e.g., as part of generating the file), the method may include identifying a quantity of data assigned to each data file of the respective group of data files. The operations of 915 may be performed in accordance with examples as disclosed herein. In some examples, aspects of the operations of 915 may be performed by a file generation component 630 as described with reference to FIG. 6.

At 920 (e.g., as part of generating the file), the method may include aligning a first data file to a first offset within a shard file of the one or more additional shard files and a second data file to a second offset within the shard file of the one or more additional shard files, where the first offset and the second offset are based on the quantity of data. The operations of 920 may be performed in accordance with examples as disclosed herein. In some examples, aspects of the operations of 920 may be performed by a data file alignment component 640 as described with reference to FIG. 6.

At 925 (e.g., as part of aligning the first file, the second file, or both), the method may include padding the second data file based on determining that, without the padding of the second data file, an alignment of the first data file relative to the first offset would fail to satisfy a threshold, where the first data file is aligned to the first offset based on the padding of the second data file. The operations of 925 may be performed in accordance with examples as disclosed herein. In some examples, aspects of the operations of 925 may be performed by a data file alignment component 640 as described with reference to FIG. 6.

At 930, the method may include distributing, by the data management system, the respective groups of shard files to a set of multiple nodes within the distributed backup system. The operations of 930 may be performed in accordance with examples as disclosed herein. In some examples, aspects of the operations of 930 may be performed by a shard file distribution component 635 as described with reference to FIG. 6.

FIG. 10 illustrates a flowchart showing a method 1000 that supports backing up database files in a distributed system in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include receiving, at a data management system, a request to generate backup data for a set of multiple data files from the one or more databases. The operations of 1005 may be performed in accordance with examples as disclosed herein. In some examples, aspects of the operations of 1005 may be performed by a backup request component 625 as described with reference to FIG. 6.

At 1010, the method may include generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition. The operations of 1010 may be performed in accordance with examples as disclosed herein. In some examples, aspects of the operations of 1010 may be performed by a file generation component 630 as described with reference to FIG. 6.

At 1015, the method may include distributing, by the data management system, the respective groups of shard files to a set of multiple nodes within the distributed backup system. The operations of 1015 may be performed in accordance with examples as disclosed herein. In some examples, aspects of the operations of 1015 may be performed by a shard file distribution component 635 as described with reference to FIG. 6.

At 1020, the method may include determining a modification to a data file of the respective group of data files in the one or more databases. The operations of 1020 may be performed in accordance with examples as disclosed herein.

In some examples, aspects of the operations of 1020 may be performed by a modification component 645 as described with reference to FIG. 6.

At 1025, the method may include modifying data included in the one or more additional shard files based on the modification to the data file in the one or more databases, where the data is corresponding to a file offset for the data file. The operations of 1025 may be performed in accordance with examples as disclosed herein. In some examples, aspects of the operations of 1025 may be performed by a modification component 645 as described with reference to FIG. 6.

FIG. 11 illustrates a flowchart showing a method 1100 that supports backing up database files in a distributed system in accordance with aspects of the present disclosure. The operations of the method 1100 may be implemented by a DMS or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include receiving, at a data management system, a request to generate backup data for a set of multiple data files from the one or more databases. The operations of 1105 may be performed in accordance with examples as disclosed herein. In some examples, aspects of the operations of 1105 may be performed by a backup request component 625 as described with reference to FIG. 6.

At 1110, the method may include generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition. The operations of 1110 may be performed in accordance with examples as disclosed herein. In some examples, aspects of the operations of 1110 may be performed by a file generation component 630 as described with reference to FIG. 6.

At 1115, the method may include distributing, by the data management system, the respective groups of shard files to a set of multiple nodes within the distributed backup system. The operations of 1115 may be performed in accordance with examples as disclosed herein. In some examples, aspects of the operations of 1115 may be performed by a shard file distribution component 635 as described with reference to FIG. 6.

At 1120, the method may include identifying a set of multiple concurrent read operations and write operations on a data file of the set of multiple data files at the one or more databases. The operations of 1120 may be performed in accordance with examples as disclosed herein. In some examples, aspects of the operations of 1120 may be performed by an operation identification component 650 as described with reference to FIG. 6.

At 1125, the method may include modifying data corresponding to the data file and included in the one or more additional shard files based on identifying the set of multiple concurrent read operations and write operations. The operations of 1125 may be performed in accordance with examples as disclosed herein. In some examples, aspects of the operations of 1125 may be performed by a modification component 645 as described with reference to FIG. 6.

A method for backing up one or more databases using a distributed backup system is described. The method may include receiving, at a data management system, a request to generate backup data for a set of multiple data files from the one or more databases, generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition, and distributing, by the data management system, the respective groups of shard files to a set of multiple nodes within the distributed backup system.

An apparatus for backing up one or more databases using a distributed backup system is described. The apparatus may include a processor, memory coupled with the processor, and instructions stored in the memory. The instructions may be executable by the processor to cause the apparatus to receive, at a data management system, a request to generate backup data for a set of multiple data files from the one or more databases, generate, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition, and distribute, by the data management system, the respective groups of shard files to a set of multiple nodes within the distributed backup system.

Another apparatus for backing up one or more databases using a distributed backup system is described. The apparatus may include means for receiving, at a data management system, a request to generate backup data for a set of multiple data files from the one or more databases, means for generating, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition, and means for distributing, by the data management system, the respective groups of shard files to a set of multiple nodes within the distributed backup system.

A non-transitory computer-readable medium storing code for backing up one or more databases using a distributed backup system is described. The code may include instructions executable by a processor to receive, at a data management system, a request to generate backup data for a set of multiple data files from the one or more databases, generate, at the data management system in response to the request, a file including a set of multiple partitions, where the set of multiple partitions include respective groups of shard files that correspond to respective groups of data files from among the set of multiple data files, and where a respective group of shard files within a partition of the set of multiple partitions includes a first shard file representative of metadata for the partition and one or more additional shard files representative of the respective group of data files for the partition, and distribute, by the data management system, the respective groups of shard files to a set of multiple nodes within the distributed backup system.

In some examples of the method, apparatuses, and non-transitory computer-readable medium described herein, generating the file may include operations, features, means, or instructions for identifying a quantity of data assigned to each data file of the respective group of data files and aligning a first data file to a first offset within a shard file of the one or more additional shard files and a second data file to a second offset within the shard file of the one or more additional shard files, where the first offset and the second offset may be based on the quantity of data.

Some examples of the method, apparatuses, and non-transitory computer-readable medium described herein may further include operations, features, means, or instructions for padding the second data file based on determining that, without the padding of the second data file, an alignment of the first data file relative to the first offset would fail to satisfy a threshold, where the first data file may be aligned to the first offset based on the padding of the second data file.

Some examples of the method, apparatuses, and non-transitory computer-readable medium described herein may further include operations, features, means, or instructions for determining a modification to a data file of the respective group of data files in the one or more databases and modifying data included in the one or more additional shard files based on the modification to the data file in the one or more databases, where the data may be corresponding to a file offset for the data file.

Some examples of the method, apparatuses, and non-transitory computer-readable medium described herein may further include operations, features, means, or instructions for modifying the metadata corresponding to the data to reflect the modification to a data file including a decrease in file size of the data file or an increase in file size of the data file.

In some examples of the method, apparatuses, and non-transitory computer-readable medium described herein, generating the file may include operations, features, means, or instructions for aligning one or more extended file portions corresponding to the respective group of data files in a set of backups, where each extended file portion of the one or more extended file portions begins at a common offset in the set of backups.

Some examples of the method, apparatuses, and non-transitory computer-readable medium described herein may further include operations, features, means, or instructions for identifying a set of multiple concurrent read operations and write operations on a data file of the set of multiple data files at the one or more databases and modifying data corresponding to the data file and included in the one or more additional shard files based on identifying the set of multiple concurrent read operations and write operations.

In some examples of the method, apparatuses, and non-transitory computer-readable medium described herein, the modifying includes performing a set of multiple write operations on the data file or performing a set of multiple read operations on the data file or both.

In some examples of the method, apparatuses, and non-transitory computer-readable medium described herein, generating the file may include operations, features, means, or instructions for mapping the set of multiple data files in the file including the set of multiple partitions to individual files capable of being exported to application.

In some examples of the method, apparatuses, and non-transitory computer-readable medium described herein, each partition of the set of multiple partitions may be associated with a same node at the data management system. In some examples of the method, apparatuses, and non-transitory computer-readable medium described herein, the file includes an aggregated format file.

The following provides an overview of aspects of the present disclosure:

Aspect 1: A method for backing up one or more databases using a distributed backup system, comprising: receiving, at a data management system, a request to generate backup data for a plurality of data files from the one or more databases: generating, at the data management system in response to the request, a file comprising a plurality of partitions, wherein the plurality of partitions comprise respective groups of shard files that correspond to respective groups of data files from among the plurality of data files, and wherein a respective group of shard files within a partition of the plurality of partitions comprises a first shard file representative of metadata for the partition and one or more additional shard files representative of the respective group of data files for the partition: and distributing, by the data management system, the respective groups of shard files to a plurality of nodes within the distributed backup system.

Aspect 2: The method of aspect 1, wherein generating the file further comprises: identifying a quantity of data assigned to each data file of the respective group of data files; and aligning a first data file to a first offset within a shard file of the one or more additional shard files and a second data file to a second offset within the shard file of the one or more additional shard files, wherein the first offset and the second offset are based at least in part on the quantity of data.

Aspect 3: The method of aspect 2, further comprising: padding the second data file based at least in part on determining that, without the padding of the second data file, an alignment of the first data file relative to the first offset would fail to satisfy a threshold, wherein the first data file is aligned to the first offset based at least in part on the padding of the second data file.

Aspect 4: The method of any of aspects 1 through 3, further comprising: determining a modification to a data file of the respective group of data files in the one or more databases: and modifying data included in the one or more additional shard files based at least in part on the modification to the data file in the one or more databases, wherein the data is corresponding to a file offset for the data file.

Aspect 5: The method of aspect 4, further comprising: modifying the metadata corresponding to the data to reflect the modification to a data file comprising a decrease in file size of the data file or an increase in file size of the data file.

Aspect 6: The method of any of aspects 1 through 5, wherein generating the file further comprises: aligning one or more extended file portions corresponding to the respective group of data files in a set of backups, wherein each extended file portion of the one or more extended file portions begins at a common offset in the set of backups.

Aspect 7: The method of any of aspects 1 through 6, further comprising: identifying a plurality of concurrent read operations and write operations on a data file of the plurality of data files at the one or more databases: and modifying data corresponding to the data file and included in the one or more additional shard files based at least in part on identifying the plurality of concurrent read operations and write operations.

Aspect 8: The method of aspect 7, wherein the modifying comprises performing a plurality of write operations on the data file or performing a plurality of read operations on the data file or both.

Aspect 9: The method of any of aspects 1 through 8, wherein generating the file further comprises: mapping the plurality of data files in the file comprising the plurality of partitions to individual files capable of being exported to application.

Aspect 10: The method of any of aspects 1 through 9, wherein each partition of the plurality of partitions is associated with a same node at the data management system.

Aspect 11: The method of any of aspects 1 through 10, wherein the file comprises an aggregated format file.

Aspect 12: An apparatus for backing up one or more databases using a distributed backup system, comprising a processor; memory coupled with the processor; and instructions stored in the memory and executable by the processor to cause the apparatus to perform a method of any of aspects 1 through 11.

Aspect 13: An apparatus for backing up one or more databases using a distributed backup system, comprising at least one means for performing a method of any of aspects 1 through 11.

Aspect 14: A non-transitory computer-readable medium storing code for backing up one or more databases using a distributed backup system, the code comprising instructions executable by a processor to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, at a data management system, a request to generate backup data for a plurality of data files from one or more databases;
   generating, at the data management system in response to the request, a file comprising a plurality of partitions, wherein, after generation of the plurality of partitions:
      each partition included in the plurality of partitions corresponds to a respective group of data files from among the plurality of data files,
      each partition included in the plurality of partitions comprises a respective group of shard files that corresponds to the respective group of data files for the partition, and
      for each partition within the plurality of partitions, the respective group of shard files for the partition comprises:
         a metadata shard file that comprises metadata associated with the partition, wherein the metadata comprises a list of the respective group of data files for the partition; and
         one or more additional shard files representative of the respective group of data files for the partition; and
   distributing, by the data management system, the respective groups of shard files to a plurality of nodes within a distributed backup system, the respective groups of shard files comprising the backup data.

2. The method of claim 1, further comprising, for each partition included in the plurality of partitions:
   identifying a quantity of data assigned to each data file of the respective group of data files for the partition;
   aligning a first data file from among the respective group of data files to a first offset within a shard file of the one or more additional shard files included in the respective group of shard files for the partition; and
   aligning a second data file from among the respective group of data files to a second offset within the shard file of the one or more additional shard files included in the respective group of shard files for the partition, wherein the first offset and the second offset are based at least in part on the quantity of data.

3. The method of claim 2, further comprising:
   padding the second data file based at least in part on determining that, without the padding of the second data file, an alignment of the first data file relative to the first offset would fail to satisfy a threshold, wherein the first data file is aligned to the first offset based at least in part on the padding of the second data file.

4. The method of claim 1, further comprising:
   determining a modification to a first data file from among the plurality of data files included in the one or more databases, wherein the first data file is included in a first respective group of data files that corresponds to a first partition from among the plurality of partitions; and modifying data included in one or more first additional shard files based at least in part on the modification to the first data file, wherein the data is corresponding to a file offset for the first data file, the one or more first additional shard files included in a first group of shard files corresponding to the first partition.

5. The method of claim 4, further comprising:

modifying first metadata included in a first metadata file to reflect the modification to the first data file comprising a decrease in a file size of the first data file or an increase in the file size of the first data file.

6. The method of claim 1, further comprising:

aligning, for a first partition from among the plurality of partitions and corresponding to a first respective group of data files, one or more extended file portions corresponding to the respective group of data files to begin at a common offset within the first respective group of data files.

7. The method of claim 1, further comprising:

identifying a plurality of concurrent read operations and write operations for a first data file from among the plurality of data files included in the one or more databases, wherein the first data file is included in a first respective group of data files that corresponds to a first partition from among the plurality of partitions; and modifying data corresponding to the first data file and included in one or more first additional shard files based at least in part on identifying the plurality of concurrent read operations and write operations, the one or more first additional shard files included in a first group of shard files corresponding to the first partition.

8. The method of claim 7, wherein the modifying comprises performing a plurality of write operations on the first data file or performing a plurality of read operations on the first data file or both.

9. The method of claim 1, further comprising:

mapping the plurality of data files in the file comprising the plurality of partitions to individual files capable of being exported to application.

10. The method of claim 1, wherein each partition included in the plurality of partitions is associated with a respective single node from among the plurality of nodes within the distributed backup system.

11. The method of claim 1, wherein the file comprises an aggregated format file.

12. An apparatus, comprising:

a processor;

memory coupled with the processor; and instructions stored in the memory and executable by the processor to cause the apparatus to:

receive, at a data management system, a request to generate backup data for a plurality of data files from one or more databases;

generate, at the data management system in response to the request, a file comprising a plurality of partitions, wherein, after generation of the plurality of partitions:

each partition included in the plurality of partitions corresponds to a respective group of data files from among the plurality of data files, each partition included in the plurality of partitions comprises a respective group of shard files that corresponds to the respective group of data files for the partition, and for each partition within the plurality of partitions, the respective group of shard files for the partition comprises:

a metadata shard file that comprises metadata associated with the partition, wherein the metadata comprises a list of the respective group of data files for the partition; and one or more additional shard files representative of the respective group of data files for the partition; and distribute, by the data management system, the respective groups of shard files to a plurality of nodes within a distributed backup system, the respective groups of shard files comprising the backup data.

13. The apparatus of claim 12, wherein the instructions are further executable by the processor to cause the apparatus to:

identify a quantity of data assigned to each data file of the respective group of data files for the partition;

align a first data file from among the respective group of data files to a first offset within a shard file of the one or more additional shard files included in the respective group of shard files for the partition; and align a second data file from among the respective group of data files to a second offset within the shard file of the one or more additional shard files included in the respective group of shard files for the partition, wherein the first offset and the second offset are based at least in part on the quantity of data.

14. The apparatus of claim 13, wherein the instructions are further executable by the processor to cause the apparatus to:

pad the second data file based at least in part on determining that, without the padding of the second data file, an alignment of the first data file relative to the first offset would fail to satisfy a threshold, wherein the first data file is aligned to the first offset based at least in part on the padding of the second data file.

15. The apparatus of claim 12, wherein the instructions are further executable by the processor to cause the apparatus to:

determine a modification to a first data file from among the plurality of data files included in the one or more databases, wherein the first data file is included in a first respective group of data files that corresponds to a first partition from among the plurality of partitions; and modify data included in one or more first additional shard files based at least in part on the modification to the first data file, wherein the data is corresponding to a file offset for the first data file, the one or more first additional shard files included in a first group of shard files corresponding to the first partition.

16. The apparatus of claim 15, wherein the instructions are further executable by the processor to cause the apparatus to:

modify first metadata included in a first metadata file to reflect the modification to the first data file comprising a decrease in a file size of the first data file or an increase in the file size of the first data file.

17. The apparatus of claim 12, wherein the instructions are further executable by the processor to cause the apparatus to:

align, for a first partition from among the plurality of partitions and corresponding to a first respective group of data files, one or more extended file portions corresponding to the respective group of data files to begin at a common offset within the first respective group of data files.

18. The apparatus of claim 12, wherein the instructions are further executable by the processor to cause the apparatus to:

identify a plurality of concurrent read operations and write operations for a first data file from among the plurality of data files included in the one or more databases, wherein the first data file is included in a first respective group of data files that corresponds to a first partition from among the plurality of partitions; and modify data corresponding to the first data file and included in one or more first additional shard files based at least in part on identifying the plurality of concurrent read operations and write operations, the one or more first additional shard files included in a first group of shard files corresponding to the first partition.

19. The apparatus of claim 18, wherein, to modify the data corresponding to the first data file and included in the one or more additional shard files, the instructions are executable by the processor to cause the apparatus to perform a plurality of write operations on the first data file or perform a plurality of read operations on the first data file or both.

20. A non-transitory computer-readable medium storing code, the code comprising instructions executable by a processor to:

receive, at a data management system, a request to generate backup data for a plurality of data files from one or more databases;

generate, at the data management system in response to the request, a file comprising a plurality of partitions, wherein, after generation of the plurality of partitions:

each partition included in the plurality of partitions corresponds to a respective group of data files from among the plurality of data files, each partition included in the plurality of partitions comprises a respective group of shard files that corresponds to the respective group of data files for the partition, and for each partition within the plurality of partitions, the respective group of shard files for the partition comprises:

a metadata shard file that comprises metadata associated with the partition, wherein the metadata comprises a list of the respective group of data files for the partition; and one or more additional shard files representative of the respective group of data files for the partition; and distribute, by the data management system, the respective groups of shard files to a plurality of nodes within a distributed backup system, the respective groups of shard files comprising the backup data.

* * * * *